Patented Dec. 19, 1950

2,534,331

UNITED STATES PATENT OFFICE 2,534,331

4,5-IMIDAZOLEDICARBONITRILE AND METHOD OF PREPARATION

David W. Woodward, Wilmington, Del., assignor to E. I. du Pont de Nemours and Company, Wilmington, Del., a corporation of Delaware No Drawing. Application August 30, 1949, Serial No. 113,247

17 Claims. (Cl. 260—309)

This invention relates to new nitrogen-containing heterocyclic compounds and to their preparation from hydrogen cyanide tetramer.

Although hydrogen cyanide tetramer, a crystalline polymer having the empirical formula, $C_4H_4N_4$, has been known for some time [Chemical Abstracts, 22, 4475 (1928); Jour. Chem. Soc. 1937, 1432], the structure of this tetramer is still uncertain. It is believed, on the basis of its chemical reactions, to be either (I) 1,2-dicyano-1,2-diaminoethylene (i. e., diaminomaleonitrile), or (II) 1,2-dicyano-1-amino-2-iminoethane (i. e., aminoiminosuccinonitrile) or an equilibrium mixture of the two forms:

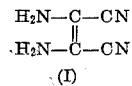

(I)

or

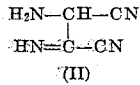

(II)

Recently, an improved process for converting hydrogen cyanide to its tetramer in essentially quantitative yields, has been described in my copending application Serial No. 10,567, filed February 24, 1948, now Patent No. 2,499,411. This method comprises continuously passing liquid hydrogen cyanide at a temperature of 0–100° C. into contact with a water-insoluble, basic-reacting, solid catalyst, e. g. alumina, and rapidly removing the tetramer, as it is formed, from the catalyst.

It is an object of this invention to produce new nitrogen-containing heterocyclic compounds.

It is another object of this invention to provide new and improved processes for the production of nitrogen-containing heterocyclic compounds.

It is a more specific object of this invention to produce 4,5-imidazole-dicarbonitrile and the 2-hydrocarbon substituted derivatives thereof, and to provide new and useful processes for the production thereof.

Other objects of the invention will appear hereinafter.

The objects of this invention may be accomplished, in general, by heating to a temperature of 70–180° C. hydrogen cyanide tetramer together with an ortho ester of a monocarboxylic acid.

This reaction may be illustrated by the following equation.

(A)

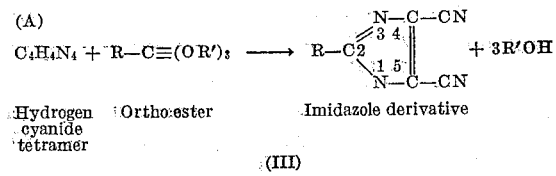

Hydrogen cyanide tetramer    Ortho ester    Imidazole derivative (III)

"R" in the above equation is hydrogen or a monovalent hydrocarbon radical, preferably alkyl radicals, particularly of from one to eleven carbon atoms, and R' is a lower alkyl radical, preferably of less than three carbon atoms.

The process of this invention, therefore, produces imidazoles having nitrile groups attached to each of the nuclear carbon atoms at the designated 4- and 5-positions of the imidazole nucleus, any other substituent on said nucleus being a monovalent hydrocarbon radical bonded on the remaining nuclear carbon atom at the 2-position.

In one method of practicing the invention, the ortho ester, for example, ethyl orthoformate, and hydrogen cyanide tetramer, preferably in equimolar amounts and in the presence of an inert liquid solvent medium such as, for example, substantially water-free anisole, are heated, suitably with stirring, at a temperature of about 70–100° C. until at least 60%, and preferably 60–80%, of the alcohol derived from the condensation is removed by distillation, and then increasing the temperature to 120–180° C., preferably 140–160° C., where it is maintained for about 10–30 minutes to complete the condensation. Although not essential, it is preferable to complete the condensation at the higher temperature in the presence of a small amount, i. e., 0.1% to 10% of the weight of the hydrogen cyanide tetramer employed, of an alkaline agent. Suitable agents for this use are alkali metal alcoholates, for example, sodium methoxide. The presence of these alkaline agents at the start of the reaction is, however, undesirable because they promote decomposition of the hydrogen cyanide tetramer.

The method of isolation will vary, depending on the inert liquid medium employed and the particular imidazole produced. Aside from the removal of the liquid reaction medium, the condensation product can, in many instances, be isolated by cooling to cause crystallization or by precipitation with a solvent such as hexane or any common organic solvent in which the product is insoluble. The solid imidazole can, in general, be purified by recrystallization from water, diethyl ether, benzene, etc.

In the preparation of the 4,5-imidazoledicarbonitrile and its 2-hydrocarbon substituted derivatives, it is preferable to employ equimolar amounts of hydrogen cyanide tetramer and ortho ester, since excesses over these amounts, for example over 10% molar excess, of the ortho esters can react further with the hydrogen on the nuclear nitrogen atom in the 1-position of the above-named imidazole compounds to split out alcohol as illustrated by the following equation:

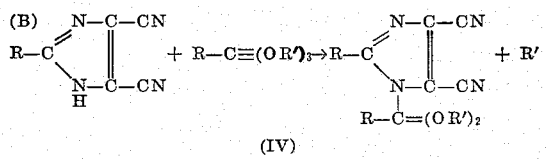

(IV)

wherein R and R' have the same meaning as previously designated in Equation A. The compounds illustrated by the Formula IV above also form a part of this invention. They can be readily prepared in good yields by reacting the hydrogen cyanide tetramer with at least double the equimolar amount of the ortho esters.

Although it is not absolutely essential, it is preferable to conduct the condensation in the presence of an inert medium capable of dissolving the reactants because it results, in general, in better reaction by promoting initimate contact of the reactants, and also serves as a medium for distillation of the alcohol of condensation. This liquid medium should be inert toward the reactants employed in the condensation and boil at least 20–30° C. above the alcohol of condensation. Preferably, it should be substantially free, i. e., less than about 0.1%, of water and act as a solvent for the reactants. Examples of suitable inert solvent liquids include anisole, phenetole, dibutyl ether, dioxane, toluene, and xylene. Of these, the ethers are preferred. Although the amount employed can vary widely, depending on the particular solvent used and the compounds processed, excellent results are obtained with from five to twenty-five parts of inert liquid solvent medium to each part of tetramer.

The following examples illustrate, in detail, certain preferred methods for the production of the above-mentioned new compounds. It is to be understood that the details of the examples are illustrative and are not to be taken as limitative of the invention.

Example I

To a closed reactor equipped with an agitator and a distillation column is charged 200 parts of substantially water-free anisole, 20 parts of hydrogen cyanide tetramer, and 29 parts of ethyl orthoformate. The mixture is then stirred and heated to distill off the ethanol (still-head temperature, 80° C.). After 18 parts of ethanol has distilled, 0.4 part of sodium methoxide is introduced into the reaction mixture and distillation is continued until the distilling temperature has been maintained at about 150° C. for 15–20 minutes. The hot solution is filtered and then cooled, whereupon a white solid crystallizes. A solution of this solid in 50 parts of boiling water is clarified with activated charcoal, filtered and cooled to yield 17.5 parts of white crystalline 4,5-imidazoledicarbonitrile, M. P. 175° C. The product is soluble in water, alcohol, and dioxane, slightly soluble in diethyl ether, and insoluble in hexane.

Chemical analysis of the white crystalline solid for carbon, hydrogen and nitrogen, and comparison with the calculated percentages of carbon, hydrogen and nitrogen in 4,5-imidazoledicarbonitrile, $C_5H_2N_4$, gave the following results:

|  | Carbon | Hydrogen | Nitrogen |
|---|---|---|---|
|  | Per cent | Per cent | Per cent |
| Calculated for $C_5H_2N_4$ | 50.85 | 1.70 | 47.45 |
| Found by analysis | 51.42 | 2.05 | 47.14 |
| Found by analysis | 51.48 | 2.27 | 47.41 |

Example II

A stirred mixture of 100 parts of dioxane, 5 parts of hydrogen cyanide tetramer, and 7 parts of ethyl orthoformate is heated in a closed reaction vessel equipped with a distillation column until the distillation temperature remains constant for about 10 minutes, and about 50 parts of distillate is collected. The reaction mixture is then diluted with 35 parts of hexane and cooled to crystallize. The precipitated solid is filtered and recrystallized from diethyl ether to give 5 parts of white crystals, M.P. 135–137° C. This compound results from the elimination of two chemical equivalents of ethanol between one of hydrogen cyanide tetramer and one of ethyl orthoformate. The structure is believed to be either

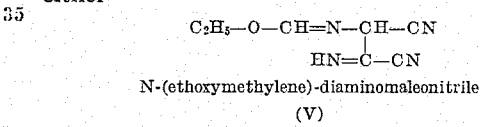

N-(ethoxymethylene)-diaminomaleonitrile (V)

or

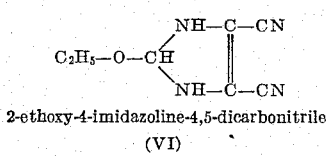

2-ethoxy-4-imidazoline-4,5-dicarbonitrile (VI)

Chemical analysis of the white crystalline product for carbon, hydrogen and nitrogen, and comparison with the calculated percentages of carbon, hydrogen and nitrogen in $C_7H_8N_4O$ gave the following results:

|  | Carbon | Hydrogen | Nitrogen |
|---|---|---|---|
|  | Percent | Percent | Percent |
| Calculated for $C_7H_8N_4O$ | 51.22 | 4.87 | 34.09 |
| Found by analysis | 51.38 | 4.93 | 33.78 |
| Found by analysis | 51.40 | 4.86 | 33.61 |

By dissolving the above compound in boiling water and then cooling, hydrogen cyanide tetramer is recovered.

Example III

A mixture of one part of the compound of Example II, $C_7H_8N_4O$, and 45 parts of xylene is boiled 15 minutes, cooled to bring about crystallization, filtered, and dried. The resulting white solid is recrystallized from diethyl ether to give 0.6 part of 4,5-imidazoledicarbonitrile, M.P. 174–175° C., identical with the product of Example I.

Example IV

A mixture of 2 parts of the compound of Example II, $C_7H_8N_4O$, is boiled with 25 parts of anisole and 0.05 part of sodium methoxide. The reaction is cooled and the white crystalline solid is filtered and recrystallized from diethyl ether to yield 1.8 parts of 4,5-imidazole-dicarbonitrile identical with that of Example I.

*Example V*

Into a closed reactor equipped with distillation column and an agitator is placed 20 parts of ethyl orthoformate, 2 parts of hydrogen cyanide tetramer and 0.1 part of potassium carbonate. The mixture is then stirred and heated at 80° C. to distill off the alcohol after which heating is continued until the distillation temperature is increased to 140° C. On dilution of the cooled reaction mixture with 100 parts of hexane, the white crystalline product which precipitates is filtered and recrystallized from hexane to give two parts of white, fluffy needles, M.P. 55–60° C. This compound, the result of reaction between two moles of ethyl orthoformate and one mole of hydrogen cyanide tetramer, is believed to be 1-(diethoxymethyl) - 4,5-imidazoledicarbonitrile, $C_{10}H_{12}N_4O_2$. (R is hydrogen and R' is ethyl in previously mentioned Formula IV.)

Chemical analysis of the white product for carbon, hydrogen and nitrogen, and comparison with the calculated percentages of carbon, hydrogen and nitrogen in $C_{10}H_{12}N_4O_2$ gave the following results:

|  | Carbon | Hydrogen | Nitrogen |
|---|---|---|---|
|  | Percent | Percent | Percent |
| Calculated for $C_{10}H_{12}N_4O_2$ | 54.54 | 5.45 | 25.45 |
| Found by analysis | 53.22 | 5.25 | 27.60 |
| Found by analysis | 53.50 | 5.14 | 27.23 |

*Example VI*

Five (5) parts of 4,5-imidazoledicarbonitrile prepared by the method of Example I is dissolved in 15 parts of concentrated sulfuric acid and allowed to stand for 15 hours at room temperature. On pouring the reaction mixture into 200 parts of ice-water, a white solid is precipitated which, after filtering, washing with water, and drying, yields 6 parts of 4,5-imidazoledicarbonamide. A solution of this compound in 25 parts of boiling water containing 2 parts of sodium carbonate is clarified with activated charcoal, filtered, cooled, and then treated with 6.5 parts of concentrated hydrochloric acid to precipitate pure-white crystalline 4,5-imidazoledicarbonamide, $C_5H_6N_4O_2$, which sublimes without melting at above 300° C., but melts in a sealed tube at 370° C.

Chemical analysis of the white crystalline product for carbon, hydrogen and nitrogen, and comparison with the calculated percentages of carbon, hydrogen and nitrogen in $C_5H_6N_4O_2$ gave the following results:

|  | Carbon | Hydrogen | Nitrogen |
|---|---|---|---|
|  | Percent | Percent | Percent |
| Calculated for $C_5H_6N_4O_2$ | 38.96 | 3.90 | 36.36 |
| Found by analysis | 38.74 | 3.85 | 36.50 |
| Found by analysis | 39.06 | 3.90 | 36.66 |

*Example VII*

The diamide described in Example VI can be converted to xanthine by the Hofmann hypohalite rearrangement. This conversion has been reported by Baxter and Spring (J. Chem. Soc., 1945, 232) in yields of ten per cent. It has now been found that by use of the following carefully selected conditions yields of xanthine in excess of 60 per cent can be obtained.

One (1) molar equivalent of 4,5-imidazoledicarbonamide and 3 to 5 molar equivalents of sodium hydroxide are dissolved in 5 to 10 times their combined weight of warm (50° C.) water. To the resulting cooled (−3° C.) solution there is added at −3° C. to 0° C. with rapid agitation 1.25 to 1.75 molar equivalents of sodium hypochlorite as a 0.2 N to 1 N solution during 0.1 to 1.0 hour. After addition is complete, the solution, which is now a yellow color, is warmed to 60° C., neutralized with acetic acid, cooled and filtered. The resulting crude xanthine together with twice its weight of sodium bicarbonate is dissolved in 25 to 50 times its weight of water. The resulting solution is then clarified with activated charcoal and filtered. Neutralization of the cooled filtrate with dilute (1:10) hydrochloric acid precipitates pure xanthine which, after filtering and drying, is obtained as a white powder in a yield of 60 to 70 per cent.

*Example VIII*

Methylation of the xanthine of Example VII with dimethyl sulfate, as for example, by the method of M. D. Rubtsov [C. A. 39, 697 (1945); J. Gen. Chem. U. S. S. R. 13, 710 (1943)], yields caffeine as pure-white crystals melting at 233–236° C. in a sealed tube heated at the rate of 2° C. per minute. By comparison, U. S. P. flake caffeine melts at 232–235° C. under the same conditions, and a mixture of the two melts at 233–236° C. Chemical analysis of the compound for carbon, hydrogen and nitrogen, and comparison with the calculated percentages of these elements in caffeine gives the following results:

|  | Carbon | Hydrogen | Nitrogen |
|---|---|---|---|
|  | Per cent | Per cent | Per cent |
| Calculated for $C_8H_{10}N_2O_2$ | 49.50 | 5.16 | 28.84 |
| Found by analysis | 49.74 | 5.19 | 28.63 |
| Found by analysis | 49.55 | 5.06 | 28.73 |

*Example IX*

Employing the method described in Example I and replacing the ethyl orthoformate used therein with 31 parts of ethyl orthoacetate, the product obtained is 2-methyl-4,5-imidazoledicarbonitrile, $C_6H_4N_4$, M. P. 230–231° C.

|  | Carbon | Hydrogen | Nitrogen |
|---|---|---|---|
|  | Per cent | Per cent | Per cent |
| Calculated for $C_6H_4N_4$ | 54.54 | 3.03 | 42.42 |
| Found by analysis | 54.10 | 3.15 | 43.34 |
| Found by analysis | 53.89 | 2.92 | 43.14 |

*Example X*

Employing the method described in Example I and replacing the ethyl orthoformate employed therein with 32 parts of ethyl orthopropionate, the product isolated is 2-ethyl-4,5-imidazoledicarbonitrile, $C_7H_6N_4$, M. P. 184–187° C.

|  | Carbon | Hydrogen | Nitrogen |
|---|---|---|---|
|  | Per cent | Per cent | Per cent |
| Calculated for $C_7H_6N_4$ | 57.54 | 4.10 | 38.36 |
| Found by analysis | 57.92 | 4.28 | 37.94 |
| Found by analysis | 57.83 | 4.12 | 37.73 |

The process of this invention is not limited to the specific ortho esters disclosed in the foregoing examples, but embraces more broadly the ortho esters of monocarboxylic acids, i. e., tri-esters of ortho monocarboxylic acids (see Introduction to the 1945 Chemical Abstracts Index, paragraph 285), particularly those wherein the ester function, e. g., the trialkoxymethyl group, is attached to a monovalent hydrocarbon radical. Other suitable ortho esters are methyl orthoformate, methyl and ethyl orthoacetates, methyl and ethyl orthopropionates, methyl orthobutyrate, methyl orthovalerate, methyl orthocaproate, methyl orthoisocaproate, methyl orthododecanoate, ethyl orthophenoxyacetate, ethyl orthobenzoate, and ethyl orthophenylacetate. Many of these compounds and the method for their preparation are described by Brooker and White, J. Amer. Chem. Soc. 57, 2485 (1935). Of these, it is preferred to employ ortho esters of alkanoic acids of one to twelve carbon atoms, particularly lower trialkyl esters in which the alkyl radical is of not more than two carbons because, by use of these, the alcohol of condensation is readily removed. The foregoing ortho esters are employed in accordance with procedures described herein. For example, by replacing the ethyl orthopropionate in Example VII with methyl orthocaproate, 2-pentyl-4,5-imidazoledicarbonitrile may be produced.

Other alkaline agents which can be satisfactorily employed to facilitate completion of the condensation reaction after removal of most of the alcohol of condensation are sodium and potassium ethoxide, sodium tertiary-butoxide, sodamide, sodium, potassium, sodium and potassium hydroxides, sodium carbonate, and the like.

The compounds of this invention are important intermediates in the synthesis of purines, especially xanthine and its methylation products such as caffeine, theobromine, theophylline, etc. For instance, the 4,5-imidazoledicarbonitrile described herein is an important new raw material for the preparation of the corresponding dicarbonamide which, as has been shown in Examples VI, VII and VIII, is of particular interest for the synthesis of caffeine of high purity. This dicarbonamide is also a useful resin intermediate that reacts with formaldehyde to give a clear, colorless, insoluble resin. The 4,5-imidazoledicarbonitrile products of this invention are also useful as intermediates for the preparation of dyes, pigments, and surface-active agents.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. A process for the production of 4,5-dicyanoimidazoles which comprises heating to a temperature of 70° C. to 180° C. hydrogen cyanide tetramer together with an ortho ester of a monocarboxylic acid.

2. A process for the production of 4,5-dicyanoimidazoles which comprises heating to a temperature of 70° C. to 180° C. a solution of hydrogen cyanide tetramer and an ortho ester of a monocarboxylic acid in an inert liquid.

3. A process for the production of 4,5-dicyanoimidazoles which comprises heating to a temperature of 70° C. to 180° C. hydrogen cyanide tetramer together with an ortho ester of a monocarboxylic acid having the formula

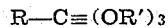

wherein R is a substituent of the group consisting of hydrogen and monovalent hydrocarbon radicals of from 1 to 11 carbon atoms and R' is an alkyl radical of less than 3 carbon atoms.

4. A process for the production of 4,5-dicyanoimidazoles which comprises heating to a temperature of 70° C. to 180° C. a solution, in an inert liquid medium, of hydrogen cyanide tetramer and an ortho ester of a monocarboxylic acid having the formula

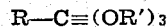

wherein R is a substituent of the group consisting of hydrogen and monovalent hydrocarbon radicals of from 1 to 11 carbon atoms and R' is an alkyl radical of less than 3 carbon atoms.

5. A process for the production of 4,5-dicyanoimidazoles which comprises heating to a temperature of 70° C. to 180° C. a solution, in an inert liquid medium, of hydrogen cyanide tetramer and an ortho ester of a monocarboxylic acid having the formula

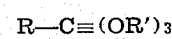

wherein R is a substituent of the group consisting of hydrogen and alkyl radicals of from 1 to 11 carbon atoms and R' is an alkyl radical of less than 3 carbon atoms.

6. A process for the production of 4,5-dicyanoimidazoles which comprises dissolving in an inert liquid medium hydrogen cyanide tetramer and an ortho ester of a monocarboxylic acid having the formula

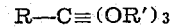

wherein R is a substituent of the group consisting of hydrogen and alkyl radicals of from 1 to 11 carbon atoms, and R' is an alkyl radical of less than 3 carbon atoms, heating said solution to a temperature of 70° C. to 100° C. until at least 60% of the alcohol formed by condensation is removed from the solution, then heating said solution to a temperature of 120° C. to 180° C. for a period of about 10 to 30 minutes.

7. A process for the production of 4,5-dicyanoimidazoles which comprises dissolving in an inert liquid medium hydrogen cyanide tetramer and an ortho ester of a monocarboxylic acid having the formula

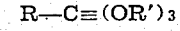

wherein R is a substituent of the group consisting of hydrogen and alkyl radicals of from 1 to 11 carbon atoms, and R' is an alkyl radical of less than 3 carbon atoms, heating said solution to a temperature of 70° C. to 100° C. until at least 60% of the alcohol formed by condensation is removed from the solution, adding an alkaline agent, then heating said solution to a temperature of 120° C. to 180° C. for a period of about 10 to 30 minutes.

8. A process for the production of 4,5-dicyanoimidazoles which comprises dissolving in an inert liquid medium hydrogen cyanide tetramer and an ortho ester of a monocarboxylic acid having the formula

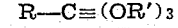

wherein R is a substituent of the group consisting of hydrogen and alkyl radicals of from 1 to 11 carbon atoms, and R' is an alkyl radical of less than 3 carbon atoms, heating said solution to a temperature of 70° C. to 100° C. until at least 60% of the alcohol formed by condensation is removed from the solution, adding 0.1% to 10%, based on weight of hydrogen cyanide tetramer dissolved, of an alkaline agent, then heating said solution to a temperature of 120° C. to 180° C. for a period of about 10 to 30 minutes.

9. A process for the production of compounds taken from the group consisting of 4,5-imidazoledicarbonitrile and 2-hydrocarbon substituted 4,5-imidazoledicarbonitriles in which the hydrocarbon substituent contains 1 to 11 carbon atoms which comprises heating to a temperature of 70° C. to 180° C. about equimolecular amounts of hydrogen cyanide tetramer and an ortho ester of a monocarboxylic acid.

10. A process for the production of compounds taken from the group consisting of 4,5-imidazoledicarbonitrile and 2-hydrocarbon substituted 4,5-imidazoledicarbonitriles in which the hydrocarbon substituent contains 1 to 11 carbon atoms which comprises heating to a temperature of 70° C. to 180° C. about equimolecular amounts of hydrogen cyanide tetramer and an ortho ester of a monocarboxylic acid of not to exceed 12 carbon atoms.

11. A process for the production of compounds taken from the group consisting of 4,5-imidazoledicarbonitrile and 2-hydrocarbon substituted 4,5-imidazoledicarbonitriles in which the hydrocarbon substituent contains 1 to 11 carbon atoms which comprises heating to a temperature of 70° C. to 180° C. about equimolecular amounts of hydrogen cyanide tetramer and an ortho ester of a monocarboxylic acid having the formula $$R\!-\!C\!\equiv\!(OR')_3$$

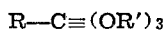

wherein R is a substituent of the group consisting of hydrogen and monovalent hydrocarbon radicals of from 1 to 11 carbon atoms and R' is an alkyl radical of less than 3 carbon atoms.

12. A process for the production of compounds taken from the group consisting of 4,5-imidazoledicarbonitrile and 2-hydrocarbon substituted 4,5-imidazoledicarbonitriles in which the hydrocarbon substituent contains 1 to 11 carbon atoms which comprises heating to a temperature of 70° C. to 180° C. about equimolecular amounts of hydrogen cyanide tetramer and an ortho ester of a monocarboxylic acid having the formula $$R\!-\!C\!\equiv\!(OR')_3$$

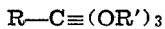

wherein R is a substituent taken from the group consisting of hydrogen and alkyl radicals of from 1 to 11 carbon atoms, and R' is an alkyl radical of less than 3 carbon atoms.

13. A process for the production of compounds taken from the group consisting of 4,5-imidazoledicarbonitrile and 2-hydrocarbon substituted 4,5-imidazoledicarbonitriles in which the hydrocarbon substituent contains 1 to 11 carbon atoms which comprises dissolving in an inert liquid medium about equimolecular amounts of hydrogen cyanide tetramer and an ortho ester of a monocarboxylic acid having the formula $$R\!-\!C\!\equiv\!(OR')_3$$

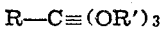

wherein R is a substituent of the group consisting of hydrogen and alkyl radicals of from 1 to 11 carbon atoms, and R' is an alkyl radical of less than 3 carbon atoms, heating said solution to a temperature of 70° C. to 100° C. until at least 60% of the alcohol formed by condensation is removed from the solution, then heating said solution to a temperature of 120° C. to 180° C. for a period of about 10 to 30 minutes.

14. A process for the production of compounds taken from the group consisting of 4,5-imidazoledicarbonitrile and 2-hydrocarbon substituted 4,5-imidazoledicarbonitriles in which the hydrocarbon substituent contains 1 to 11 carbon atoms which comprises dissolving in an inert liquid medium about equimolecular amounts of hydrogen cyanide tetramer and an ortho ester of a monocarboxylic acid having the formula $$R\!-\!C\!\equiv\!(OR')_3$$

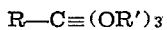

wherein R is a substituent of the group consisting of hydrogen and alkyl radicals of from 1 to 11 carbon atoms, and R' is an alkyl radical of less than 3 carbon atoms, heating said solution to a temperature of 70° C. to 100° C. until at least 60% of the alcohol formed by condensation is removed from the solution, adding an alkaline agent, then heating said solution to a temperature of 120° C. to 180° C. for a period of about 10 to 30 minutes.

15. A process for the production of compounds taken from the group consisting of 4,5-imidazoledicarbonitrile and 2-hydrocarbon substituted 4,5-imidazoledicarbonitriles in which the hydrocarbon substituent contains 1 to 11 carbon atoms which comprises dissolving in an inert liquid medium about equimolecular amounts of hydrogen cyanide tetramer and an ortho ester of a monocarboxylic acid having the formula $$R\!-\!C\!\equiv\!(OR')_3$$

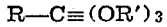

wherein R is a substituent of the group consisting of hydrogen and alkyl radicals of from 1 to 11 carbon atoms, and R' is an alkyl radical of less than 3 carbon atoms, heating said solution to a temperature of 70° C. to 100° C. until at least 60% of the alcohol formed by condensation is removed from the solution, adding 0.1% to 10%, based on the weight of hydrogen cyanide tetramer dissolved, of an alkaline agent, then heating said solution to a temperature of 120° C. to 180° C. for a period of about 10 to 30 minutes.

16. A process for the production of compounds taken from the group consisting of 4,5-imidazoledicarbonitrile and 2-hydrocarbon substituted 4,5-imidazoledicarbonitriles in which the hydrocarbon substituent contains 1 to 11 carbon atoms which comprises dissolving in an inert liquid medium about equimolecular amounts of hydrogen cyanide tetramer and an ortho ester of a monocarboxylic acid having the formula $$R\!-\!C\!\equiv\!(OR')_3$$

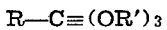

wherein R is a substituent of the group consisting of hydrogen and alkyl radicals of from 1 to 11 carbon atoms, and R' is an alkyl radical of less than 3 carbon atoms, heating said solution to a temperature of 70° C. to 100° C. until at least 60% of the alcohol formed by condensation is removed from the solution, adding 0.1% to 10%, based on the weight of hydrogen cyanide tetramer dissolved, of sodium methylate, then heating said solution to a temperature of 120° C. to 180° C. for a period of about 10 to 30 minutes.

17. 4,5-imidazoledicarbonitrile.

DAVID W. WOODWARD.

REFERENCES CITED

The following references are of record in the file of this patent:

Chem. Abst., vol 31, page 6654 (1937).
Chem. Abst., vol. 32, pp. 3394–3395 (1938).